(12) United States Patent
Kobayashi et al.

(10) Patent No.: US 8,451,700 B2
(45) Date of Patent: May 28, 2013

(54) OPTICAL PICKUP DEVICE AND OPTICAL READ/WRITE APPARATUS

(75) Inventors: Yasushi Kobayashi, Osaka (JP); Yohichi Saitoh, Kyoto (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/609,484

(22) Filed: Sep. 11, 2012

(65) Prior Publication Data
US 2013/0083641 A1   Apr. 4, 2013

(30) Foreign Application Priority Data

Sep. 29, 2011 (JP) ................................. 2011-213971

(51) Int. Cl.
*G11B 7/00* (2006.01)

(52) U.S. Cl.
USPC ..................... 369/53.28; 369/44.42

(58) Field of Classification Search
None
See application file for complete search history.

(56) References Cited

FOREIGN PATENT DOCUMENTS

| JP | 60-179950 A | 9/1985 |
|---|---|---|
| JP | 62-099922 A | 5/1987 |
| JP | 05-128576 A | 5/1993 |
| JP | 06-162532 | 6/1994 |

*Primary Examiner* — Wayne Young
*Assistant Examiner* — Brian Butcher
(74) *Attorney, Agent, or Firm* — Renner, Otto, Boisselle & Sklar, LLP

(57) ABSTRACT

In one embodiment, the optical pickup device includes: a light source that emits a light beam; a diffractive element that diffracts the light beam and generates a zero-order and ±first-order diffracted light beams; an objective lens that converges the diffracted light beams onto the same track on the storage medium; and a photodetector that receives the diffracted light beams reflected from the storage medium. If a distance from a light beam spot left by the zero-order diffracted light beam on the track to light beam spots left by the ±first-order diffracted light beams on that track is d [μm], the scanning linear velocity of the storage medium is v [m/s], and a time it takes for a phase-change material of the storage medium that has once been melted by the zero-order diffracted light beam to solidify is T [μs], $vT \leq d$ is satisfied.

15 Claims, 11 Drawing Sheets

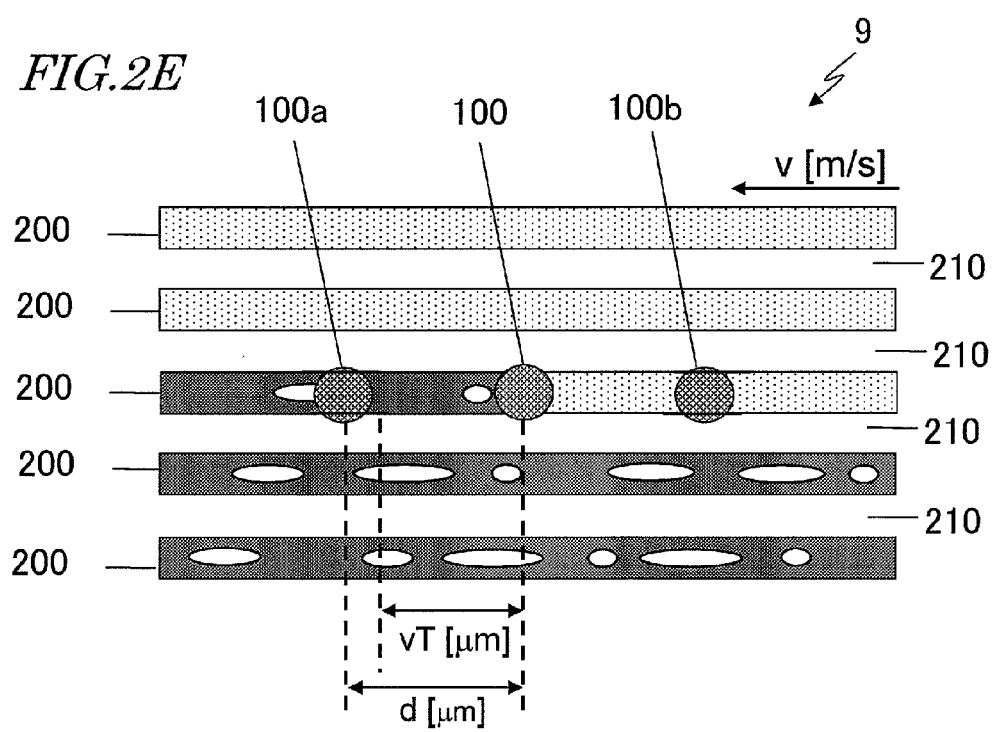

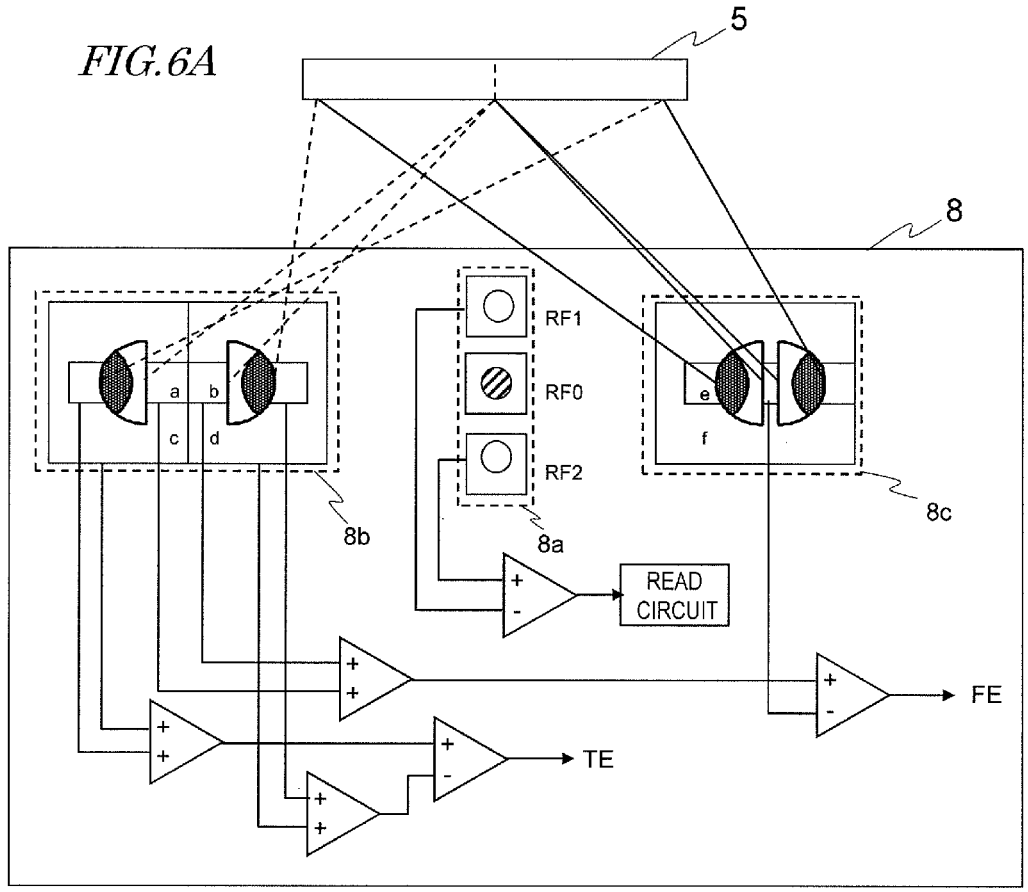
FIG.6A
EQUATION ACCORDING TO CFF METHOD : (a+c)-(b+d)
EQUATION ACCORDING TO SSD METHOD : (a+b)-e
FIG.6B
IF FOCAL POINT OF LIGHT BEAM GETS
CLOSER TO STORAGE MEDIUM
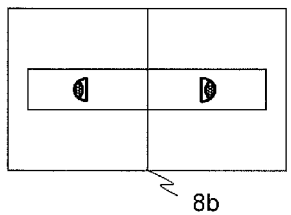
8b
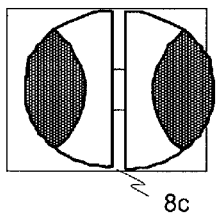
8c
IF FOCAL POINT OF LIGHT BEAM GETS
MORE DISTANT FROM STORAGE MEDIUM
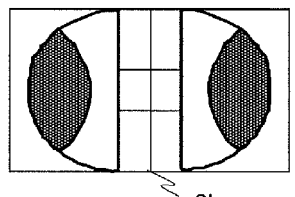
8b          8c EQUATION ACCORDING TO CFF METHOD : (a+b)-(c+d)
EQUATION ACCORDING TO KNIFE EDGE METHOD : e-f

IF FOCAL POINT OF LIGHT BEAM GETS
CLOSER TO STORAGE MEDIUM

IF FOCAL POINT OF LIGHT BEAM GETS
MORE DISTANT FROM STORAGE MEDIUM

OPTICAL PICKUP DEVICE AND OPTICAL READ/WRITE APPARATUS

BACKGROUND OF THE INVENTION

1. Field of the Invention

The present disclosure relates to an optical pickup and optical read/write apparatus that reads and writes data from/on an optical storage medium by irradiating its storage layer with light that has been emitted from a laser light source. More particularly, the present disclosure relates to an apparatus that verifies data being written on an optical storage medium by itself. Examples of optical storage media that can be used include an optical tape, an optical disc, and an optical card.

2. Description of the Related Art

Recently, the size of digital data that can be stored on a storage medium has been rising steeply year by year as the resolutions of video data and still picture data have been tremendously increased and as increasing numbers of paper media have been converted into electronic ones. Meanwhile, so-called "crowd computing" technologies that allow people to use various kinds of applications and services via servers and storage systems on some network have become more and more popular nowadays. According to such crowd computing technologies, as a huge number of users save various kinds of data on that storage system on the network, the amount of data accumulated there should keep on skyrocketing from now on.

In the meantime, as regulations have been established one after another with regard to the duty of preserving such a huge amount of data saved, it should also be increasingly important to devise a method for saving that enormous amount of data as securely and as reliably as possible.

An apparatus that writes data of such a huge size on an optical storage medium must perform the operation of seeing if data has been written just as intended on the optical storage medium in order to increase the reliability of writing. Such an operation will be referred to herein as a "verify operation". In this description, an "optical storage medium" will refer to a medium on which a mark can be recorded optically when irradiated with a light beam. And the light beam is radiated from an "optical pickup" that includes a light source and an optical system that focuses the light beam emitted from the light source onto the medium. When the optical pickup irradiates an optical storage medium with a light beam, an irradiated portion of the optical storage medium comes to have a different optical property (such as a refractive index) from the other non-irradiated portion of the medium. Such an irradiated portion, of which the optical property has varied, will be referred to herein as a "recorded mark".

In optical storage technologies, data can be read out from an optical storage medium by irradiating the storage medium with a relatively weak light beam with a constant intensity and detecting the light that has been modulated by, and reflected from, the optical storage medium. On a rewritable optical storage medium, a recording material film, from/on which data can be read and written optically, is deposited by evaporation process, for example, on the surface of a base (which may be either a disc or a long film) on which grooves and lands are arranged. In writing data on rewritable optical storage medium, data is written there by irradiating the optical storage medium with a pulsed light beam, of which the optical power has been changed according to the data to be written, and locally changing the property of the recording material film.

In a recordable or rewritable optical storage medium, when data is going to be written on its recording material film, the recording material film is irradiated with such a light beam, of which the optical power has been modulated as described above, thereby recording an amorphous mark on a crystalline recording material film. Such an amorphous recorded mark is formed there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on an optical storage medium, the light beam always needs to maintain a predetermined converging state on a target track. For that purpose, a "focus control" and a "tracking control" need to be done. The "focus control" means controlling the position of an objective lens along a normal to the disc surface so that the focal point (or at least the converging point) of the light beam is always located on the target track. On the other hand, the "tracking control" means controlling the position of the objective lens perpendicularly to the track so that the light beam spot is always located right on the target track.

In order to perform such a focus control or a tracking control, the focus error or the tracking error needs to be detected based on the light that has been reflected from the optical storage medium and the position of the light beam spot needs to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical storage medium.

According to a known method, an optical pickup device for use to read and write data from/on a magneto-optical (MO) disc or an optical disc such as a Blu-ray disc (BD), a DVD or a CD can perform a verify operation while writing data using a zero-order light beam and ±first-order light beams that have been split by a diffraction grating. When such a method is adopted, the light beam that has been emitted from a laser light source is split through a diffraction grating and the storage layer of a given optical disc is irradiated with the zero-order and ±first-order light beams. Specifically, a write operation is performed using the zero-order light beam and a verify operation is performed using the ±first-order light beams. Such a technique is called "DRAW (direct read after write)". With that technique adopted, data that has just been written is checked for any errors, thus resulting in higher processing rates and higher transfer rates. Such a technique is disclosed in Japanese Laid-Open Patent Publication No. 6-162532, for example.

The known method, however, takes into account neither how long it will take to complete the phase change right after a write operation has been done nor how much an aberration to be produced due to unexpected off-axis incidence of ±first-order diffracted light beams on an objective lens will affect. That is why the performance of the verify operation could be insufficient. For example, if a read signal for verification were generated while crystals right after a write operation has been done are changing their phase into an amorphous one, then the reflectance and the mark length would be slightly different from their expected values and the performance of the verify operation would decline. Likewise, if a read signal for verification were generated when there is significant influence of aberrations, the scanning performance would decline, too.

As for known magneto-optical discs, DVDs and CDs, an aberration produced due to such an unexpected off-axis incidence of light beams on an objective lens is tolerated to a certain degree. However, when a write operation needs to be performed on a BD that requires higher accuracy or on an optical tape with the optical disc technologies applied, the aberration produced will often be too significant to satisfy the required performance.

To overcome such a problem, the present disclosure provides an optical pickup device that will achieve stabilized verify performance with scanning linear velocities on an optical disc, an optical tape or any other optical storage medium taken into account.

Also, an embodiment of the present invention provides an optical pickup device that can minimize the generation of aberrations and will achieve stabilized verify performance with scanning linear velocities on an optical storage medium taken into account.

SUMMARY OF THE INVENTION

An optical pickup device as an embodiment of the present invention can write data on a track on an optical storage medium and can read the data that has been written on the track. The device includes: a laser light source configured to emit a light beam; a diffractive element configured to diffract the light beam and splits the light beam into a plurality of diffracted light beams including a zero-order diffracted light beam and ±first-order diffracted light beams; an objective lens configured to converge the zero-order and ±first-order diffracted light beams onto the same track on the optical storage medium; and a photodetector arranged to receive the zero-order and ±first-order diffracted light beams that have been reflected from the optical storage medium. If a distance from a light beam spot left by the zero-order diffracted light beam on the track on the optical storage medium to light beam spots left by the ±first-order diffracted light beams on the track is d [μm], the scanning linear velocity of the optical storage medium is v [m/s], and a time it takes for a phase-change material of the optical storage medium that has once been melted by the zero-order diffracted light beam to solidify is T [μs], $vT \leq d$ is satisfied.

In one embodiment, $0.3v \leq d$ is satisfied.

In another embodiment, the photodetector includes three light receiving elements that respectively receive the zero-order diffracted light beam and the ±first-order diffracted light beams, and if the ratio of the size of a light beam spot on the photodetector to the size of the light beam spot on the track is m and the minimum permissible length of each said light receiving element is 1 [μm], $1/m \leq d$ is further satisfied.

In this particular embodiment, $5 \leq d$ is satisfied.

In still another embodiment, $0.3v \leq d$ and $5 \leq d \leq 14$ are satisfied.

In yet another embodiment, the optical pickup device further includes: a quarter-wave plate that is arranged on an optical path leading to the optical storage medium; and a polarization hologram element that further diffracts the zero-order diffracted light beam that has been reflected from the optical storage medium and transmitted through the quarter-wave plate. The photodetector is configured to receive the zero-order and ±first-order diffracted light beams that have been transmitted through the polarization hologram element and the zero-order diffracted light beam that has been diffracted by the hologram element.

In this particular embodiment, the photodetector generates a focus error signal and a tracking error signal based on the zero-order diffracted light beam that has been diffracted by the polarization hologram element.

In a specific embodiment, the photodetector generates the tracking error signal by a correct far-field method.

In an alternative embodiment, the photodetector generates the focus error signal by either a spot size detection method or a knife edge method.

In yet another embodiment, the photodetector outputs, as a read signal, a differential signal representing a difference in the intensity between reflected light that has left the light beam spot of the +first-order diffracted light beam and reflected light that has left the light beam spot of the −first-order diffracted light beam.

An optical read/write apparatus as an embodiment of the present invention includes: an optical pickup device according to any of the embodiments of the present invention described above; an optical modulator configured to modulate the intensity of the light beam so that when data is written on the track on the optical storage medium, a mark is recorded on the track by the zero-order diffracted light beam; and a processing section configured to read the mark that has been recorded on the track based on the output of the optical pickup device while writing data on the track on the optical storage medium.

In one embodiment, the processing section generates a read signal based on a differential signal representing a difference in the intensity between reflected light that has left the light beam spot of the +first-order diffracted light beam and reflected light that has left the light beam spot of the −first-order diffracted light beam.

An optical pickup device as another embodiment of the present invention can write data on a track on an optical storage medium and can read the data that has been written on the track. The device includes: a first laser light source configured to emit a first light beam; a second laser light source configured to emit a second light beam; an objective lens configured to converge the first and second light beams onto the same track on the optical storage medium; and a photodetector arranged to receive the first and second light beams that have been reflected from the optical storage medium. If a distance from a light beam spot left by the first light beam on the track on the optical storage medium to a light beam spot left by the second light beam on the track is d [μm], the scanning linear velocity of the optical storage medium is v [m/s], and a time it takes for a phase-change material of the optical storage medium that has once been melted by the first light beam to solidify is T [μs], $vT \leq d$ is satisfied.

An optical read/write apparatus as still another embodiment of the present invention includes: an optical pickup device according to the embodiment described above; an optical modulator configured to modulate the intensity of the first light beam so that when data is written on the track on the optical storage medium, a mark is recorded on the track by the first light beam; and a processing section configured to read the mark that has been recorded on the track based on the output of the optical pickup device while writing data on the track on the optical storage medium.

In one embodiment, the apparatus includes at least one more optical pickup device in addition to the optical pickup device, and those optical pickup devices write data on multiple different tracks on the optical storage medium in parallel with each other.

According to an embodiment of the present invention, a phase transition time that is long enough to get the verify operation done can be ensured, and therefore, an optical pickup device with stabilized verify performance can be provided.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 2E is a plan view showing the intervals between those three light beam spots on the track on the optical storage medium.

FIG. 6A illustrates exactly in what patterns the photodetector may receive the reflected light when the CFF and SSD methods are adopted in combination.

FIG. 6B illustrates how defocusing affects when the photodetector shown in FIG. 6A is adopted.

Figure 7:
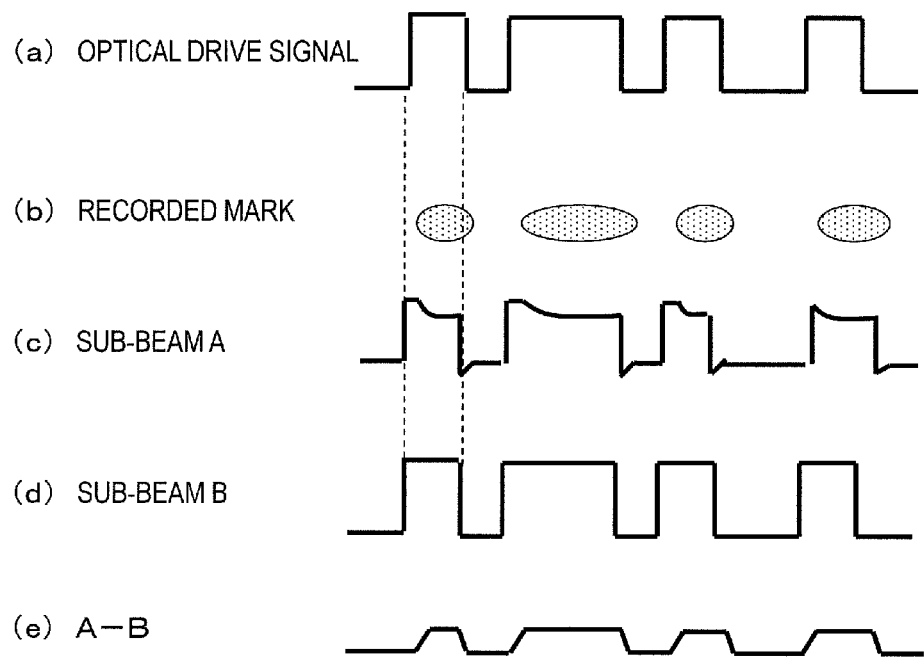

Portion (a) of FIG. 7 shows an exemplary waveform of an optical drive signal, portion (b) of FIG. 7 illustrates examples of recorded marks, portions (c) and (d) show exemplary waveforms of two signals representing sub-beams A and B received, respectively, and portion (e) of FIG. 7 shows an exemplary waveform of a differential signal between those two signals representing the two sub-beams received.

Figure 8A:
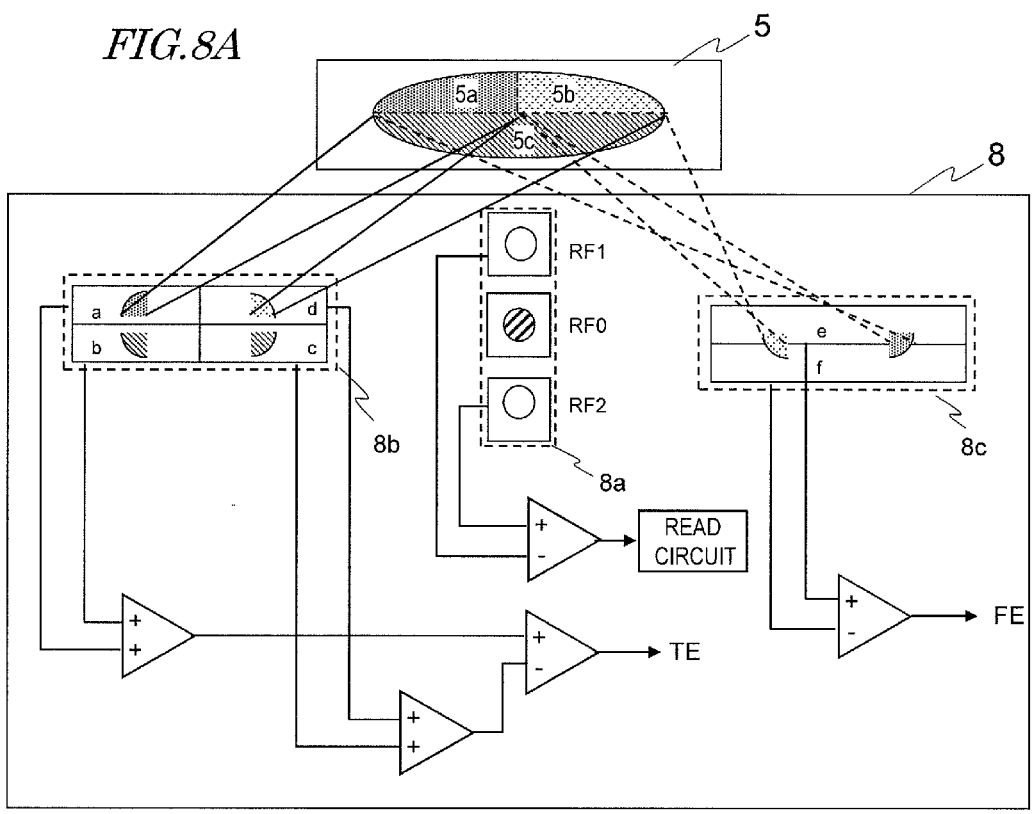

FIG. 8A illustrates exactly in what patterns the photodetector may receive the reflected light when the CFF and knife edge methods are adopted in combination.

Figure 8B:
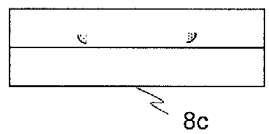
Figure 8B:
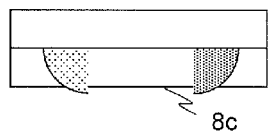

FIG. 8B illustrates how defocusing affects when the photodetector shown in FIG. 8A is adopted.

Figure 9:
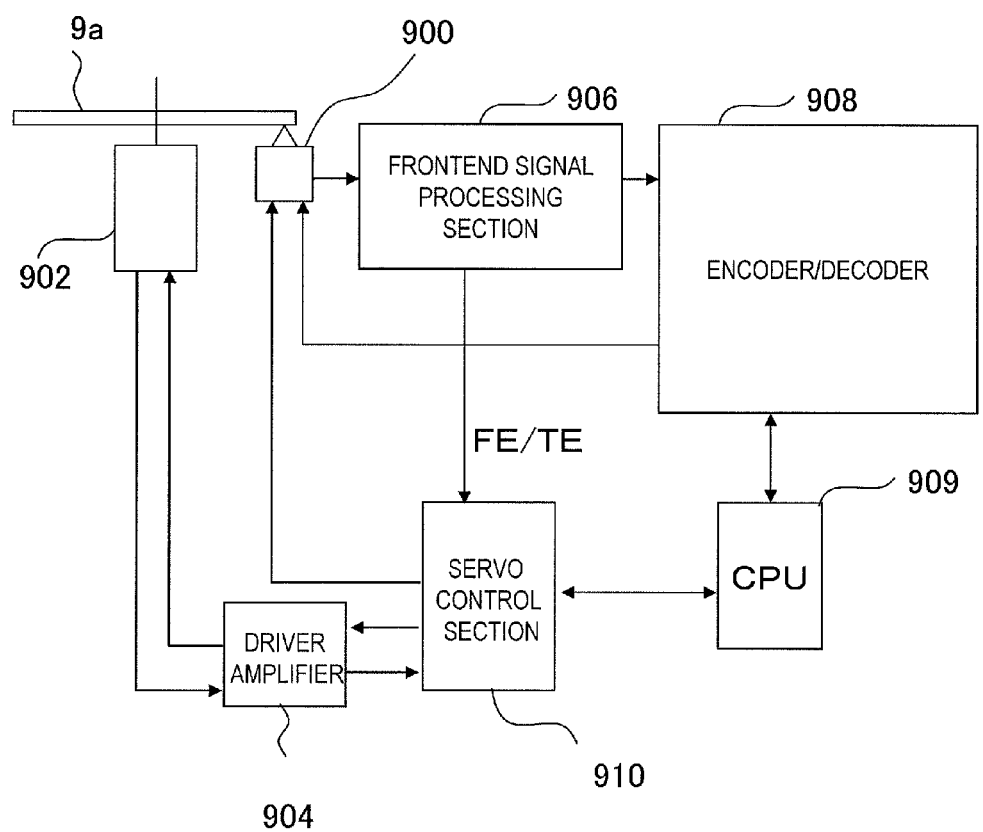

FIG. 9 is a block diagram illustrating a general arrangement for an optical read/write apparatus as a second embodiment of the present invention.

DETAILED DESCRIPTION OF EMBODIMENTS

Hereinafter, embodiments of the present invention will be described with reference to the accompanying drawings. In the following description, any pair of components shown in multiple drawings and having substantially the same or similar function will be identified by the same reference numeral.

Figure 1:
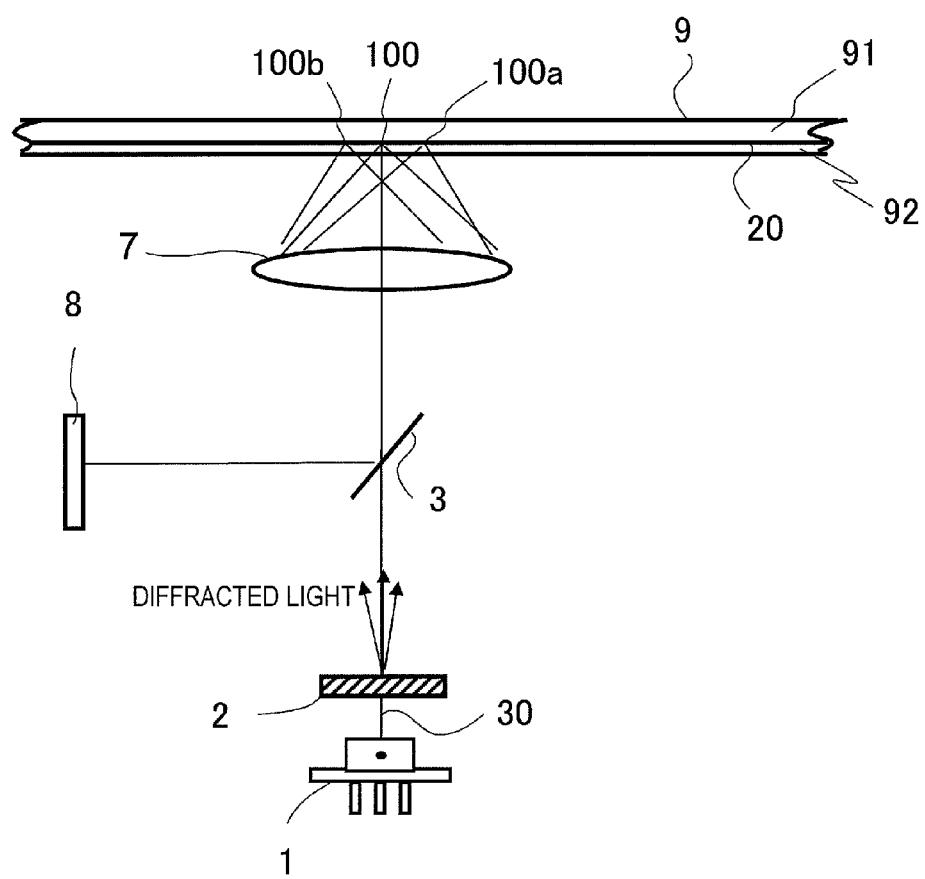
FIG. 1 illustrates a general optical configuration for an optical pickup device as an embodiment.

Before specific embodiments are described, it will be described first what configuration an optical pickup device according to the present invention may have and how it works. FIG. 1 illustrates the arrangement of an optical system for an optical pickup device as an example of the present invention. The optical pickup device shown in FIG. 1 is used to write data on a track on an optical storage medium 9 and to read the data that has been written on the track. Examples of the optical storage medium 9 include optical discs, optical tapes and optical cards. And the optical storage medium 9 includes a storage layer 20, a substrate or film that supports the storage layer 20, and a light-transmitting protective layer 92.

This optical pickup device includes a laser light source 1 which emits a light beam 30, a diffractive element 2 which diffracts the light beam 30 and splits it into multiple diffracted light beams including a zero-order diffracted light beam and ±first-order diffracted light beams, an objective lens 7 which condenses the zero-order and ±first-order diffracted light beams onto the same track on the optical storage medium 9, and a photodetector 8 which receives at least a part of the zero-order and ±first-order diffracted light beams that have been reflected from the optical storage medium 9. In the example illustrated in FIG. 1, a beam splitter 3 is further provided to guide the light that has been reflected from the optical storage medium 9 to the photodetector 8.

In FIG. 1, only three diffracted light beams are illustrated schematically as light beams leaving the diffractive element 2. Actually, however, more diffracted light beams may be produced. The central one of the three light beams illustrated is a zero-order diffracted light beam, and the other two are ±first-order diffracted light beams. The angles of diffraction shown in FIG. 1 are exaggerated and larger than actual ones. Each of these three diffracted light beams is transmitted through the beam splitter 3 and the objective lens 7 to form a light beam spot on the same track on the optical storage medium 9.

Figure 2A:
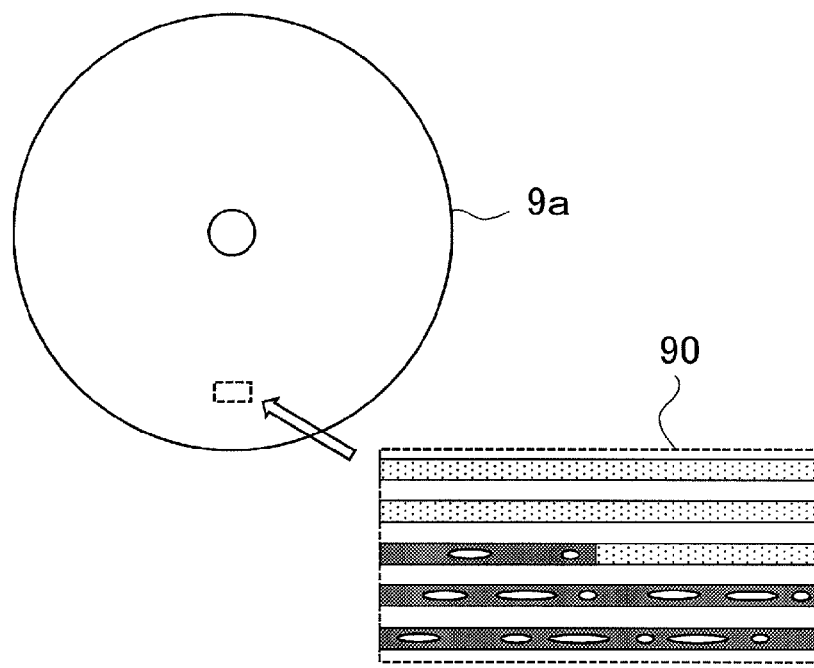
FIG. 2A is a schematic representation illustrating some of the tracks of an optical disc.
Figure 2B:
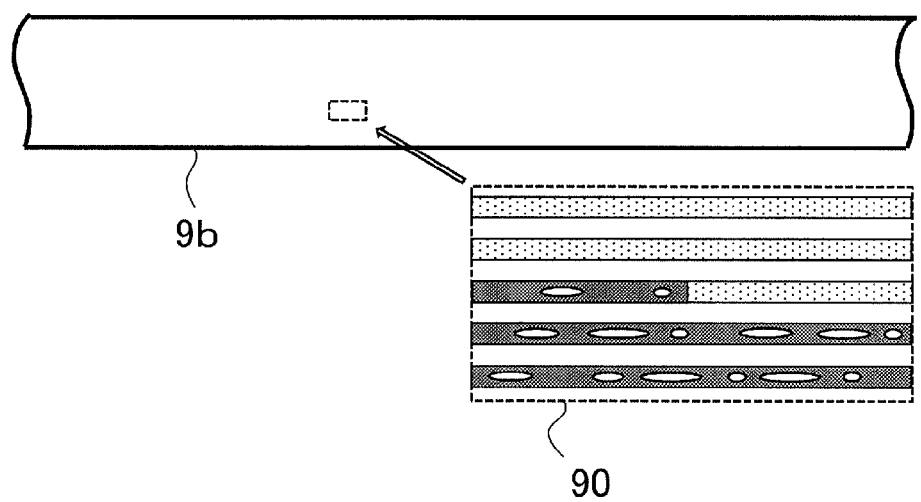
FIG. 2B is a schematic representation illustrating some of the tracks of an optical tape.

As the optical storage medium 9, either the optical disc 9a shown in FIG. 2A or the optical tape 9b shown in FIG. 2B may be used, for example. In FIG. 2A, five tracks are illustrated as an example in an area 90 that shows a portion (i.e., the dotted rectangular area) of the optical disc 9a on a larger scale. The optical disc 9a has a number of concentric or spiral tracks. Likewise, in FIG. 2B, five tracks are illustrated as an example in an area 90 that shows a portion (i.e., the dotted rectangular area) of the optical tape 9b on a larger scale. The optical tape 9b has a lot of tracks that are arranged parallel to each other. In reading or writing data from/on it, the optical disc 9a rotates, while the optical tape 9b runs in the length direction.

Figure 2C:
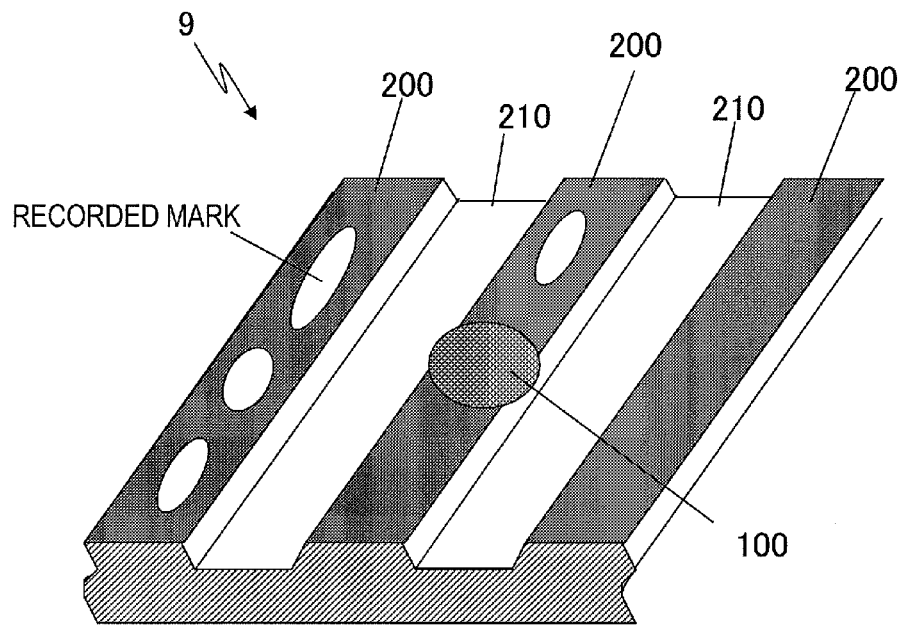
FIG. 2C is a perspective view schematically illustrating some of the tracks of an optical storage medium.

FIG. 2C is a schematic perspective view illustrating a portion of the optical storage medium 9 on a larger scale. In FIG. 2C, illustrated is a main spot 100 for writing data. This main spot 100 is left there by a zero-order diffracted light beam. That is to say, the zero-order diffracted light beam, of which the intensity has been modulated according to the data to be written, forms a recorded mark, representing that data, on the track being scanned with the main spot 100.

As shown in FIG. 2C, the optical storage medium 9 has a configuration in which lands 200 and grooves 210 are arranged alternately. In the example illustrated in FIG. 2C, the bottom of the grooves 210 has been etched deeper than the top of the lands 200. A multilayer structure, including the storage layer 20 and the protective layer 92, is arranged on a substrate or film 91 with such lands 200 and grooves 210. In FIG. 2C, however, illustration of such a multilayer structure is omitted for the sake of simplicity.

In this example, marks are recorded only on the lands 200 of the optical storage medium 9, not on any of the grooves 210. That is to say, in this example, the lands 200 function as "tracks". Alternatively, contrary to this example, marks may also be recorded only on the grooves 210 of the optical storage medium 9. In that case, the grooves 210 function as tracks. Thus, the marks are recorded on either the lands 200 or the grooves 210, not both.

Figure 2D:
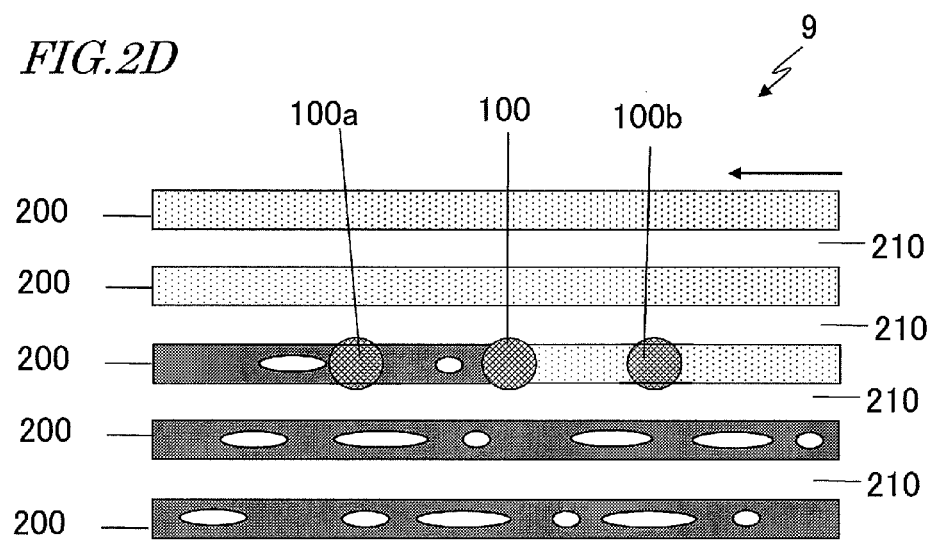
FIG. 2D is a plan view illustrating three light beam spots that are left on a track on an optical storage medium.

FIG. 2D is a plan view illustrating an exemplary arrangement of light beam spots that are left by this optical pickup device on the optical storage medium 9. In FIG. 2D, illustrated are not only the main spot 100 left by the zero-order diffracted light beam but also sub-spots 100a and 100b left by the ±first-order diffracted light beams. In this example, the optical storage medium 9 moves in the direction indicated by the arrow with respect to these light beam spots. By making the photodetector 8 detect the reflected light of the +first-order diffracted light beam that has left the sub-spot 100a, the recorded mark can be read. With such a configuration adopted, a verify operation can be performed using the reflected light that has left the sub-spot 100a right after a mark has been recorded with the main spot 100.

FIG. 2E illustrates relative positions of the main spot 100 and the sub-spots 100a and 100b. In this example, the illustrated tracks of the optical storage medium 9 are supposed to be moving at a scanning linear velocity v [m/s] in the direction indicated by the arrow with respect to the light beam spots. If the time it takes for the phase-change material of the optical storage medium 9 that has once been melted by the zero-order diffracted light beam to solidify is T [μs], the optical configuration of this optical pickup device is designed so that the distance d [μm] between the main spot 100 and the sub-spot 100a satisfies the following Inequality (1):

$$vT \leq d \qquad (1)$$

To satisfy this condition means contributing to improving the quality of the read signal obtained by the DRAW operation for the following reasons:

As disclosed in Japanese Laid-Open Patent Publication No. 6-162532, according to the known DRAW technologies, it has been taken for granted that the interval between a spot for writing and a spot for reading on a given track be as short as possible in order to simplify the configuration, cut down the cost and stabilize the tracking control. This is because they believe that even if the interval between those spots for writing and reading is shortened but if the focal length of the optical system is set so as to increase the magnification of detection sufficiently, the light for reading can still be detected with no problem. In this description, the "magnification of detection" refers herein to the ratio of the size of a light beam spot on the photodetector to that of its corresponding light beam spot on the track.

However, the present inventors discovered that the shorter the interval between the main spot 100 and the sub-spot 100a, the more frequently the read signal tends to generate errors. As a result of experiments, the present inventors came to the conclusion that this should be because before the recorded mark formed with the main spot 100 is cooled sufficiently, the sub-spot 100a could reach the position of the recorded mark. In that case, the phase-change material with a disturbed atomic arrangement would be irradiated with the light beam for reading (i.e., the +first-order diffracted light beam in this example). As a result, the intensity of the reflected light that has left the sub-spot 100a would change from the expected value, thus causing instability in the read operation.

Thus, based on this discovery, the arrangement of the respective elements is determined according to this embodiment of the present invention so as to satisfy Inequality (1). As a result, it is not until the phase-change material is cooled sufficiently that the sub-spot 100a reaches the position of the recorded mark, and therefore, the quality of the read signal can be stabilized.

In the example described above, the +first-order diffracted light beam is supposed to be used as a light beam for reading. However, the −first-order diffracted light beam may also be used as a light beam for reading. Also, as for an optical tape that can run bidirectionally, the verify operation can get done irrespective of the running direction by switching the ±first-order diffracted light beams with each other when the running direction reverses.

Figure 3:
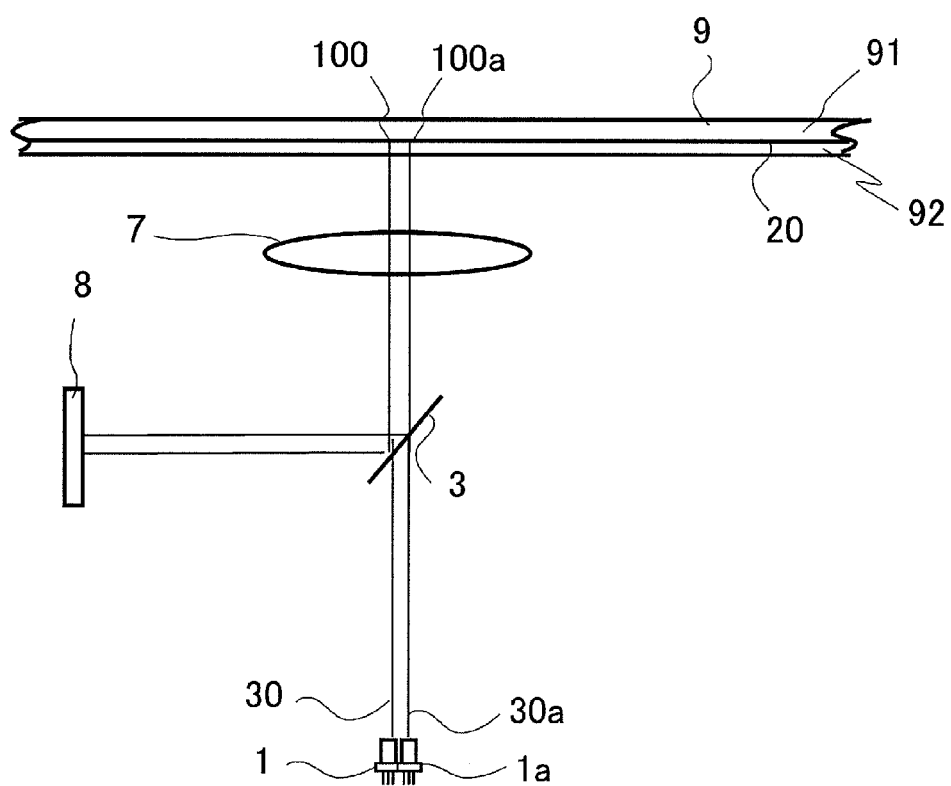
FIG. 3 illustrates a general optical configuration for an optical pickup device as another embodiment.

However, according to the present invention, the configuration described above does not have to be adopted. Alternatively, the optical storage medium 9 may also be irradiated as shown in FIG. 3 with a main beam 30 and a sub-beam 30a by using two closely arranged laser light sources 1 and 1a in place of the diffractive element 2. In the exemplary arrangement shown in FIG. 3, when data is going to be written with a verify operation performed, the light beams 30 and 30a are emitted from the laser light sources 1 and 1a, respectively. In this example, the light beams 30 and 30a respectively form a main spot 100 and a sub-spot 100a on the same track on the optical storage medium 9. The photodetector 8 receives the reflected light that has left the main spot 100 and the reflected light that has left the sub-spot 100a.

In the example illustrated in FIG. 3, the optical configuration of the optical pickup device is also designed so that the distance d between the main spot 100 and the sub-spot 100a also satisfies Inequality (1). As a result, the read signal can also be stabilized as well as in the example shown in FIG. 1.

Even though only one objective lens 7 is illustrated in FIG. 3, two objective lenses may be provided so as to condense the main beam 30 and the sub-beam 30a independently of each other. Also, if the data write operation and verify operation are performed with the track running direction reversed, then the roles played by the two laser light sources 1 and 1a may be changed with each other. That is to say, in that case, the optical pickup device may be configured to write data using the light beam 30a emitted from the laser light source 1a and to perform the verify operation using the light beam 30 emitted from the laser light source 1.

Hereinafter, more specific embodiments of the present invention will be described.

(Embodiment 1)

1. Optical Pickup's Configuration

Figure 4:
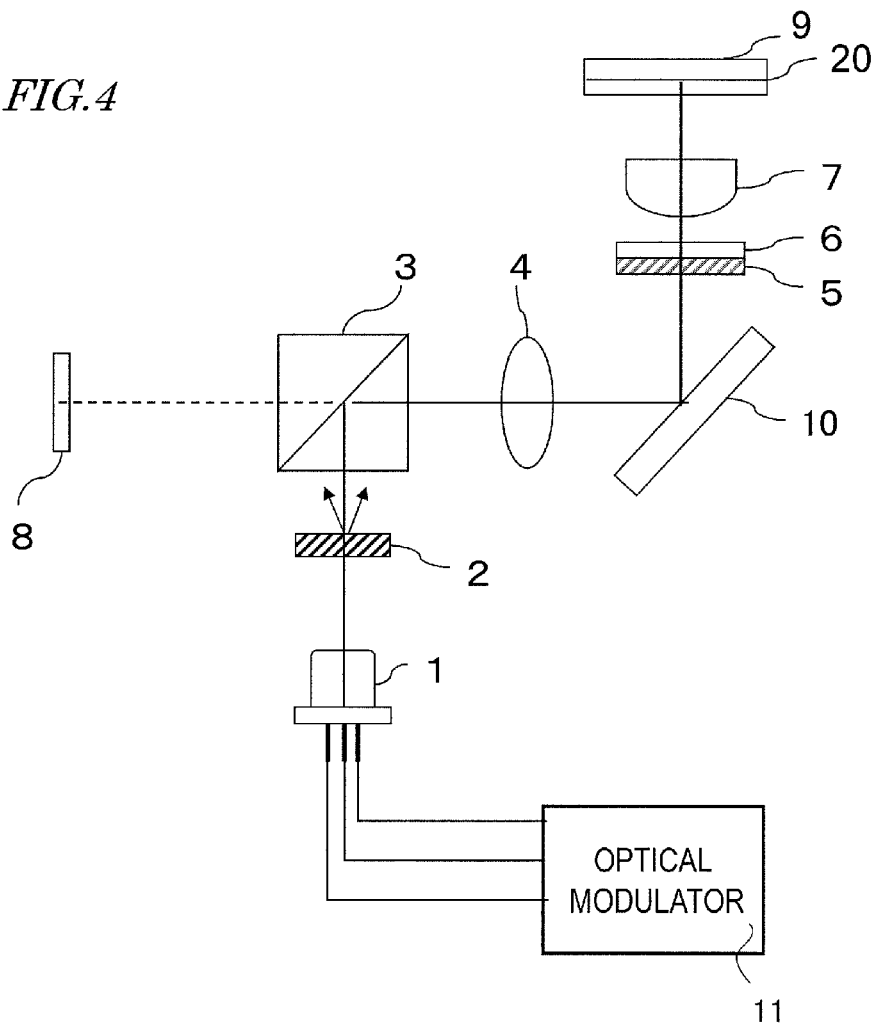
FIG. 4 illustrates a general arrangement of an optical pickup device as a first embodiment of the present invention.

FIG. 4 illustrates a general arrangement for an optical pickup device as a first embodiment of the present invention. This optical pickup device includes a semiconductor laser light source 1 with an oscillating wavelength of 405 nm, a diffraction grating 2, a beam splitter 3, a collimator lens 4, a high reflecting mirror 10, a polarization hologram element 5, a quarter-wave plate 6, an objective lens 7, and a photodetector 8. The optical pickup device further includes an optical modulator 11 that generates an optical drive signal for modulating the optical power of the light emitted from the laser light source 1 in order to record a mark on the storage layer 20 of the optical storage medium 9. The optical modulator 11 is typically arranged in the optical pickup but may also be arranged outside of the optical pickup. The optical storage medium 9 may be an optical disc, an optical tape, or an optical card, for example.

The light beam that has been emitted from the semiconductor laser light source 1 is split by the diffraction grating 2 into a plurality of diffracted light beams including a zero-order diffracted light beam and ±first-order diffracted light beams. After that, those light beams are reflected by a beam splitter 3 and enter the collimator lens 4, which transforms them into substantially parallel light beams. Then, those light beams are reflected from the high reflecting mirror 10, transmitted through the polarization hologram element 5 and then transmitted through the quarter-wave plate 6. In the meantime, those plane polarized light beams are transformed into circularly polarized light beams and then enter the objective lens 7, which condenses the light beams onto a storage layer 20 of the optical storage medium 9. On their way back, those light beams are reflected from the storage layer 20 and pass through the quarter-wave plate 6 again. In the meantime, those light beams are transformed into plane polarized light beams, of which the polarization directions intersect with theirs on the way toward the optical storage medium 9. Thereafter, the plane polarized light beams that have passed through the quarter-wave plate 6 get diffracted by the polarization hologram element 5, thereby producing diffracted light beams for use to perform servo controls. Subsequently, the light beams that have been transmitted through the polarization hologram element 5 are reflected by the high reflecting mirror 10, transmitted through the collimator lens 4 and the beam splitter 3, and then incident on the photodetector 8.

In this example, the polarization hologram element 5 has its polarization directions determined so as to transmit the light beams as they are on their way from the diffraction grating 2 toward the storage layer 20 but to diffract the light beams on their way back from the storage layer 20 toward the photodetector 8. Specifically, on the way back, the zero-order and ±first-order diffracted light beams that have been reflected from the storage layer 20 are incident on the polarization hologram element 5. In those zero-order and ±first-order diffracted light beams, their parts that are transmitted as they are through the polarization hologram element 5 are used to generate a read signal (RF signal). Meanwhile, the zero-order diffracted light beam is further diffracted by the polarization hologram element 5 to produce more ±first-order diffracted light beams (which will be referred to herein as "secondary ±first-order diffracted light beams" and) which are used to generate a focus error signal and a tracking error signal. An exemplary configuration for the polarization hologram element 5 and examples of various kinds of signals generated will be described later.

By adopting such a configuration, data can be written using the zero-order diffracted light beam and a verify operation can be carried out using the reflected light of the ±first-order diffracted light beams.

2. Consideration of Phase Transition Time

A Ge—Sb—Te or Ag—In—Sb—Te based phase-change material, which is generally used as a material for an optical storage medium 9 such as an optical disc or an optical tape, usually needs a time of approximately 0.3 μs to get the phase change after write stabilized. In this description, to "stabilize" means solidifying the phase-change material that has once been melted by the zero-order light beam. If the verify (read) operation is performed using the ±first-order light beams right after data has been written using the zero-order light beam, good performance cannot be ensured for the verify operation unless plenty of time is left to stabilize the phase change material. That is why if the scanning linear velocity of the optical storage medium 9 of this embodiment is v [m/s], the optical configuration is designed so that the distance d [μm] between the spots of the zero-order and ±first-order light beams on the storage layer 20 satisfies the following Inequality (2):

$$0.3v \leq d \tag{2}$$

3. Correlation with Aberration

Figure 5:
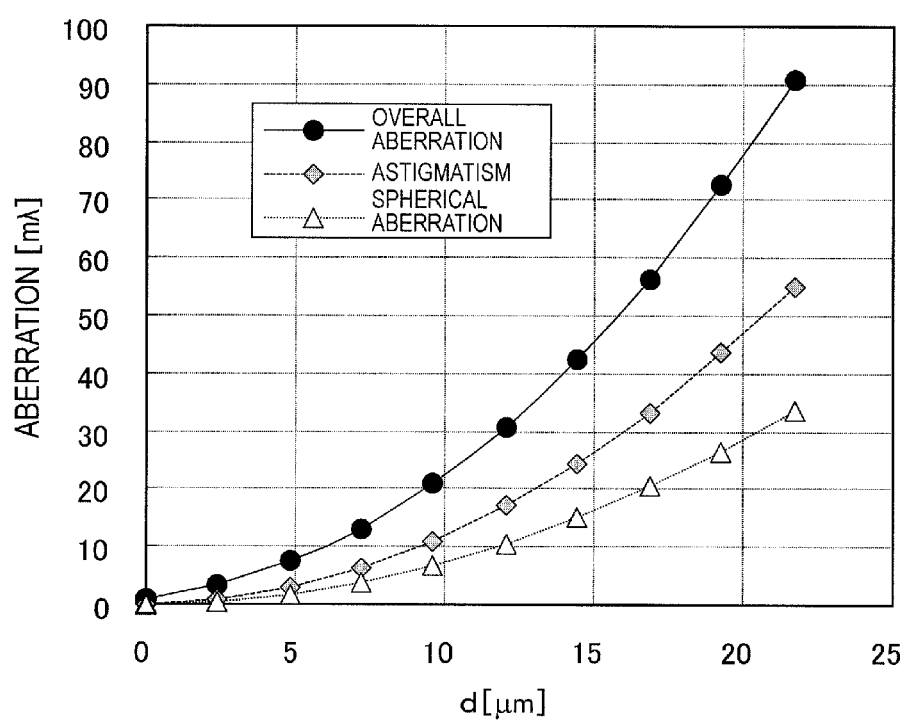
FIG. 5 shows how the aberrations produced changes with the distance between the spots of the zero-order and ±first-order light beams.

It is recommended that the optical configuration be designed with not only the phase transition time but also the influence of aberrations taken into account. FIG. 5 shows how the aberrations produced changes with the distance d between the spots of the zero-order and ±first-order light beams in a situation where the objective lens 7 has a focal length f of 1.30 mm. The longer the distance d, the larger the angle of incidence of incoming light on the objective lens 7. That is why the astigmatism and spherical aberration increase quadratically with respect to the distance d as shown in FIG. 5. The overall aberration that the optical pickup can tolerate is 70 mλ or less if the root mean square (RMS) of a major aberration such as astigmatism, spherical aberration or coma aberration is calculated. Also, considering the influence of other aberrations to be caused by a lens and other optical members or due to some deterioration with time, the maximum permissible value of the aberration produced due to the distance d is approximately 40 mλ. As can be seen from FIG. 5, if the distance d is approximately 14 μm or less, the aberration produced can be reduced to 40 mλ or less. Thus, according to this embodiment, the configurations and arrangement of the respective elements are determined so that the distance d [μm] satisfies the following Inequality (3):

$$d \leq 14\ \mu m \tag{3}$$

It should be noted that 14 μm is the upper limit when f=1.3 mm. Thus, if f changes, so does the upper limit. If a generalized sign f is used, Inequality (3) can be rewritten into the following Inequality (4):

$$d \leq 14 \times f/1.3 \tag{4}$$

4. Photodetector's Configuration and Signal Processing

Next, it will be described what configuration the photodetector 8 of this embodiment may have and how the photodetector 8 may perform its signal processing.

As described above, to minimize generation of aberrations, the shorter the distance d between the main spot 100 of the zero-order light beam and the sub-spots 100*a*, 100*b* of the ±first-order light beams, the better. That is why according to this embodiment, a method for condensing the reflected light onto the photodetector 8 through the hologram element 5 is adopted. This method will work fine because by using a hologram, the interference in the layout of light receiving areas between the zero-order and ±first-order light beams can be avoided more easily than in a situation where a light receiving section that generates an RF signal requires some area as when a cylindrical lens is used.

In the example illustrated in FIG. 6A, the correct far field (CFF) method is adopted as a tracking detection method and the spot size detection (SSD) method is adopted as a focus detection method. The photodetector 8 has a central photosensitive area 8*a* and two more photosensitive areas 8*b* and 8*c*, which are located on the right- and left-hand sides of the central photosensitive area 8*a*. The photosensitive area 8*a* has a main light receiving element RF0 that is arranged in the middle and two sub-light receiving elements RF1 and RF2 that are adjacent to the main light receiving element RF0 and interpose it between them. The photosensitive area 8*b* has four light receiving elements a, b, c and d, while the photosensitive area 8*c* has two light receiving elements e and f. Each light receiving element is, for example, comprised of a photodiode.

The photodetector 8 receives, at the central photosensitive area 8*a*, the zero-order and ±first-order light beams that have been transmitted through the hologram element 5. More specifically, the zero-order light beam is incident on the light receiving element RF0, the +first-order light beam is incident on the light receiving element RF1, and the −first-order light beam is incident on the light receiving element RF2.

On the other hand, the secondary ±first-order diffracted light beams, which have been produced due to the diffraction of the zero-order light beam by the hologram element 5, are condensed onto the photosensitive areas 8b and 8c. More specifically, the secondary +first-order diffracted light beam that has been produced by a half of the hologram element 5 shown on the left-hand side in FIG. 6A forms a light beam spot on the right half of the photosensitive area 8b. Conversely, the secondary +first-order diffracted light beam that has been produced by the other half of the hologram element 5 shown on the right-hand side in FIG. 6A forms a light beam spot on the left half of the photosensitive area 8b. Meanwhile, the secondary −first-order diffracted light beam that has been produced by a half of the hologram element 5 shown on the left-hand side in FIG. 6A forms a light beam spot on the left half of the photosensitive area 8c. Conversely, the secondary −first-order diffracted light beam that has been produced by the other half of the hologram element 5 shown on the right-hand side in FIG. 6A forms a light beam spot on the right half of the photosensitive area 8c. Optionally, the hologram element 5 may also be configured so that the secondary +first-order diffracted light beam is incident on the photosensitive area 8c and the secondary −first-order diffracted light beam is incident on the photosensitive area 8b contrary to this example.

In this example, a tracking error signal and a focus error signal are generated based on the output signals of the respective light receiving elements in the photosensitive areas 8b and 8c. If the output signals of those light receiving elements a, b, c, d, e and f are identified by their own reference signs, the tracking error signal TE and the focus error signal FE are generated by making calculations represented by the following Equations (5) and (6), respectively:

$$TE=(a+c)-(b+d) \quad (5)$$

$$FE=(a+c)-e \quad (6)$$

FIG. 6B illustrates how the light beam spots on the photosensitive areas 8b and 8c change their shapes when the light beam gets defocused. If the focal point of a light beam (i.e., the zero-order diffracted light beam) gets closer to the optical storage medium 9 than in the in-focus state, the light beam spots on the photosensitive area 8b decrease their sizes while the light beam spots on the photosensitive area 8c increase their sizes. Conversely, if the focal point of the zero-order diffracted light beam gets more distant from the optical storage medium 9 than in the in-focus state, the light beam spots on the photosensitive area 8b increase their sizes while the light beam spots on the photosensitive area 8c decrease their sizes. That is why it can be seen that the focusing state can be detected by making the calculation represented by Equation (6).

On the other hand, if a tracking error has occurred, the balance of the amount of light received by the right and left portions of the photosensitive area 8b changes. That is why it can be seen that the tracking state can be detected by making the calculation represented by Equation (5).

Meanwhile, the read signal is generated by the light receiving elements in the photosensitive area 8a. If a read operation needs to be performed just normally with no verification, then the output of the light receiving element RF0 may be used as the read signal. If the optical storage medium 9 is an unrecorded one, the read signal while a verify operation is being performed can be generated by calculating the difference between the respective outputs of the two light receiving elements RF1 and RF2 in the photosensitive area 8a. This respect will be further described with reference to FIG. 7.

Portion (a) of FIG. 7 shows an exemplary waveform of an optical drive signal. Portion (b) of FIG. 7 schematically illustrates the shapes of marks to be recorded on a track. Each of these marks is recorded on an area where the main spot 100 is located when the optical drive signal is high.

Portions (c) and (d) of FIG. 7 show the waveform of a signal representing the reflected light of the +first-order diffracted light beam that has left the sub-spot 100a and that of a signal representing the reflected light of the −first-order diffracted light beam that has left the sub-spot 100b, respectively. As can be seen from portion (c) of FIG. 7, the waveform of the reflected light that has left the sub-spot 100a is affected by a recorded mark because the spot of a light beam that has been modulated with the optical drive signal has moved on a track with the recorded mark. On the other hand, as can be seen from portion (d) of FIG. 7, the waveform of the reflected light that has left the sub-spot 100b is not affected by any recorded mark because the spot of a light beam that has been modulated with the optical drive signal has moved on a track with no recorded marks.

Portion (e) of FIG. 7 shows the waveform of a differential signal that is obtained by subtracting the signal representing the reflected light that has left the sub-spot 100b from the signal representing the reflected light that has left the sub-spot 100a. This waveform includes information about the positions and shapes of the recorded marks, i.e., a read signal. Thus, it can be seen that a read signal can be generated by calculating the difference between the two light receiving elements RF1 and RF2. The same operation can get done if the direction of scanning the optical storage medium 9 with the light beam spot reverses. In that case, the sign of the differential signal representing the difference between the light receiving elements RF1 and RF2 needs to be inverted.

FIG. 8A illustrates an alternative configuration for the photodetector 8. In this example, the correct far field (CFF) method is also adopted as a tracking detection method as in the example described above but the knife edge method is adopted as a focus detection method. The hologram element 5 is also configured in this example so that one of the two secondary ±first-order diffracted light beams produced by the hologram element 5 is condensed on the photosensitive area 8b and the other is condensed on the photosensitive area 8c.

In this example, the zero-order and ±first-order light beams that have been just transmitted through the hologram element 5 without being diffracted are incident on the photosensitive area 8a. More specifically, the zero-order light beam is incident on the light receiving element RF0, the +first-order light beam is incident on the light receiving element RF1, and the −first-order light beam is incident on the light receiving element RF2.

The hologram element 5 has three areas 5a, 5b and 5c and is designed so that three diffracted light beams will travel in three different directions after having left those three areas. Although the zero-order diffracted light beam that has been reflected from the storage layer 20 is incident on those three areas 5a, 5b and 5c that are included in the ellipse shown in FIG. 8A, no light is incident on the other area. That is why the hologram may or may not be present in that area other than the elliptical one shown in FIG. 8A. In this example, the secondary +first-order diffracted light beam produced through the area 5a is condensed on the light receiving element a, the secondary −first-order diffracted light beam produced through the area 5b is condensed on the light receiving element d, and the secondary −first-order diffracted light beam produced through the area 5a and the secondary +first-order diffracted light beam produced through the area 5b are incident on the light receiving elements e and f horizontally separately on the paper on which FIG. 8A is drawn. It should be noted that the hologram element 5 is designed so that the ±first-order diffracted light beams produced through the area 5c are not incident on any light receiving element.

In the example illustrated in FIG. 8A, a tracking error signal TE and a focus error signal FE are generated by making calculations represented by the following Equations (7) and (8), respectively:

$$TE=(a+b)-(c+d) \qquad (7)$$

$$FE=e-f \qquad (8)$$

FIG. 8B illustrates how the light beam spots on the photosensitive areas 8b and 8c change their shapes when the light beam gets defocused. In this example, if the focal point of the zero-order diffracted light beam gets closer to the optical storage medium 9 than in the in-focus state, the light beam spots on the photosensitive area 8c shift upward on the paper on which FIG. 8A is drawn and decrease their sizes. Conversely, if the focal point of the zero-order diffracted light beam gets more distant from the optical storage medium 9 than in the in-focus state, the light beam spots on the photosensitive area 8c shift downward on the paper on which FIG. 8A is drawn and increase their sizes. That is why it can be seen that the focusing state can be detected by making the calculation represented by Equation (8).

On the other hand, if a tracking error has occurred, the light beam spots on the photosensitive area 8c will shift horizontally on the paper on which FIG. 8A is drawn. That is why it can be seen that the tracking state can be detected by making the calculation represented by Equation (7).

Meanwhile, the read signal can also be generated based on the output of the photosensitive area 8a as in the example shown in FIG. 6A. That is to say, when a normal read signal needs to be generated, the output of the light receiving element RF0 may be used as it is. On the other hand, when a verify operation needs to be performed, the read signal may be generated by calculating the difference between the light receiving elements RF1 and RF2.

As described above, by using a photodetector 8 with the configuration shown in FIG. 6A or 8A, a read signal and servo signals (including a focus error signal and a tracking error signal) can be generated. Although the photodetector 8 includes circuits for generating a read signal and servo signals in the exemplary configurations shown in FIGS. 6A and 8A, those circuits may be arranged outside of the photodetector 8 as well.

In the example described above, when a verify operation needs to be performed, the read signal is supposed to be generated by calculating the difference between the light receiving elements RF1 and RF2. However, this is just an example of the present invention. Alternatively, a monitoring section that monitors the optical drive signal may be provided and the read signal may be obtained by subtracting the output of the monitoring section from the signal representing the sub-beam A shown in portion (c) of FIG. 7. This method can be used particularly effectively especially when a verify operation needs to be performed on a recorded optical storage medium 9 while rewriting the data stored there because no read signal could be obtained by such a method that calculates the difference.

5. Consideration of Light Receiving Elements' Sizes

The distance d between the main spot 100 and sub-spots 100a, 100b on a track had better be determined with not only the condition described above but also the sizes of the light receiving elements in the photodetector 8 taken into consideration. If the SSD method or the knife edge method is adopted as a focus detection method as in the embodiment described above, the light receiving element RF0 that detects the zero-order light beam and the light receiving elements RF1 and RF2 that detect the ±first-order light beams had better have a size of at least 50 μm each side in practice. Meanwhile, if the astigmatism method that uses a cylindrical lens instead of the hologram element 5 is adopted as a focus detection method, for example, the sizes of the light receiving elements need to be further increased.

If the objective lens 7 has a focal length f of 1.3 mm and if the collimator lens 4 has a focal length f1 of 13.0 mm, for example, then the ratio of the size of a light beam spot on the photodetector 8 to that of its corresponding light beam spot on a track (i.e., the magnification of detection) is 10×. In that case, the distance d between the main spot 100 left by the zero-order light beam on the storage layer 20 and the sub-spots 100a, 100b left there by the ±first-order light beams had better be 5 μm or more.

Speaking more generally, if the magnification of detection is m and if the minimum permissible length of each light receiving element is l [μm], it is recommended that the optical configuration be designed so as to satisfy the following Inequality (9):

$$l/m \leq d \qquad (9)$$

6. Conclusion

As described above, the optical pickup device of this embodiment can get the verify operation done by reading and writing data in parallel. In a situation where the magnification of detection is 10× as described above, if the distance between the main spot 100 left by the zero-order light beam on the storage layer 20 and the sub-spots 100a, 100b left there by the ±first-order light beams is d [μm] and if the scanning linear velocity is v [m/s], the optical pickup device of this embodiment is designed so as to satisfy $0.3v \leq d$ and $5 \leq d \leq 14$.

By satisfying these conditions, plenty of phase transition time can be left to get the verify operation done, and generation of aberrations due to off-axis incidence of ±first-order light beams on the objective lens 7 can be minimized. As a result, stabilized verify performance can be achieved.

(Embodiment 2)

Hereinafter, an embodiment of an optical read/write apparatus according to the present invention will be described with reference to FIG. 9. Although the optical read/write apparatus shown in FIG. 9 is an optical disc drive, an optical read/write apparatus according to the present invention does not have to be an optical disc drive but may also be an optical tape drive system, for example.

The optical disc drive illustrated in FIG. 9 includes an optical pickup 900, a disc motor 902 that rotates the optical disc 9a, and sections that perform various kinds of signal processing. The optical pickup 900 may be an optical pickup device according to any of the embodiments of the present invention described above.

In the exemplary configuration shown in FIG. 9, the output of the optical pickup 900 is supplied to an encoder/decoder 908 by way of a frontend signal processing section 906. In reading data, the encoder/decoder 908 decodes the data that is stored on the optical disc 9a based on the signal that has been generated by the optical pickup 900. The encoder/decoder 908 includes an optical modulator. In writing data, the encoder/decoder 908 encodes the data to generate a signal to be written on the optical disc 9a and outputs the signal to the optical pickup 900. Using that signal, the intensity of the light beam is modulated so as to record a mark as intended. The frontend signal processing section 906 generates a read signal based on the output of the optical pickup 900, and also generates a focus error signal FE and a tracking error signal TE. The focus error signal FE and the tracking error signal TE are then supplied to a servo control section 910. In response, the servo control section 910 gets the disc motor 902 controlled by a driver amplifier 904. The servo control section 910 also gets the position of an objective lens controlled by a lens actuator in the optical pickup 900. The encoder/decoder 908, the servo control section 910 and all the other components are controlled by a CPU 909.

The frontend signal processing section 906 and the encoder/decoder 908 can read a mark that has been recorded on a target track on the optical storage medium 9 based on the output of the optical pickup device 900 while writing data on the target track. As a result, data being written can be verified concurrently. In this embodiment, the frontend signal processing section 906 and the encoder/decoder 908 work together to carry out the function of the processing section of an optical read/write apparatus according to the present invention.

A similar configuration to the one shown in FIG. 9 is applicable to an optical tape drive system, not the optical disc drive. A major difference between an optical tape drive system and an optical disc drive lies in their drive mechanism for an optical storage medium. Specifically, when an optical tape is used as an optical storage medium, multiple rollers are used to make the optical tape run. Also, the optical tape drive system may include multiple optical pickups to read or write data from/on multiple tracks on an optical tape in parallel.

In the embodiment described above, the optical read/write apparatus includes only one optical pickup 900. However, the optical read/write apparatus may also have two or more optical pickups 900. It is beneficial if the optical read/write apparatus is configured so that those optical pickups can write data on multiple different tracks on the optical storage medium simultaneously because the write and verify operations can get done quickly.

If multiple optical pickup devices according to the present invention are used in a data storage system that can handle a huge quantity of data, data can be written accurately either on multiple different areas of a given optical storage medium or on multiple different optical storage media in parallel with each other. Thus, the present invention provides a cost-effective read/write apparatus with a simplified configuration.

While the present invention has been described with respect to embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2011-213971 filed Sep. 29, 2011 and No. 2012-029367 filed Feb. 14, 2012, the entire contents of which are hereby incorporated by reference.

What is claimed is:

1. An optical pickup device that is configured to write data on a track on an optical storage medium and to read the data that has been written on the track, the device comprising:
   a laser light source configured to emit a light beam;
   a diffractive element configured to diffract the light beam and split the light beam into a plurality of diffracted light beams including a zero-order diffracted light beam and ±first-order diffracted light beams;
   an objective lens configured to converge the zero-order and ±first-order diffracted light beams onto the same track on the optical storage medium; and
   a photodetector arranged to receive the zero-order and ±first-order diffracted light beams that have been reflected from the optical storage medium,
   wherein if a distance from a light beam spot left by the zero-order diffracted light beam on the track on the optical storage medium to light beam spots left by the ±first-order diffracted light beams on the track is d [μm], the scanning linear velocity of the optical storage medium is v [m/s], and a time it takes for a phase-change material of the optical storage medium that has once been melted by the zero-order diffracted light beam to solidify is T [μs], $vT \leq d$ is satisfied.

2. The optical pickup device of claim 1, wherein $0.3v \leq d$ is satisfied.

3. The optical pickup device of claim 1, wherein the photodetector includes three light receiving elements that respectively receive the zero-order diffracted light beam and the ±first-order diffracted light beams, and
   wherein if the ratio of the size of a light beam spot on the photodetector to the size of the light beam spot on the track is m and the minimum permissible length of each said light receiving element is l [μm], $l/m \leq d$ is further satisfied.

4. The optical pickup device of claim 3, wherein $5 \leq d$ is satisfied.

5. The optical pickup device of claim 1, wherein $0.3v \leq d$ and $5 \leq d \leq 14$ are satisfied.

6. The optical pickup device of claim 1, further comprising:
   a quarter-wave plate that is arranged on an optical path leading to the optical storage medium; and
   a polarization hologram element that further diffracts the zero-order diffracted light beam that has been reflected from the optical storage medium and transmitted through the quarter-wave plate,
   wherein the photodetector is configured to receive the zero-order and ±first-order diffracted light beams that have been transmitted through the polarization hologram element and the zero-order diffracted light beam that has been diffracted by the hologram element.

7. The optical pickup device of claim 6, wherein the photodetector generates a focus error signal and a tracking error signal based on the zero-order diffracted light beam that has been diffracted by the polarization hologram element.

8. The optical pickup device of claim 7, wherein the photodetector generates the tracking error signal by a correct far-field method.

9. The optical pickup device of claim 7, wherein the photodetector generates the focus error signal by either a spot size detection method or a knife edge method.

10. The optical pickup device of claim 1, wherein the photodetector outputs, as a read signal, a differential signal representing a difference in the intensity between reflected light that has left the light beam spot of the +first-order diffracted light beam and reflected light that has left the light beam spot of the −first-order diffracted light beam.

11. An optical pickup device that is configured to write data on a track on an optical storage medium and to read the data that has been written on the track, the device comprising:
   a first laser light source configured to emit a first light beam;
   a second laser light source configured to emit a second light beam;

an objective lens configured to converge the first and second light beams onto the same track on the optical storage medium; and a photodetector arranged to receive the first and second light beams that have been reflected from the optical storage medium, wherein if a distance from a light beam spot left by the first light beam on the track on the optical storage medium to a light beam spot left by the second light beam on the track is d [μm], the scanning linear velocity of the optical storage medium is v [m/s], and a time it takes for a phase-change material of the optical storage medium that has once been melted by the first light beam to solidify is T [μs], $vT \leq d$ is satisfied.

12. An optical read/write apparatus comprising:

the optical pickup device of claim 1;

an optical modulator configured to modulate the intensity of the light beam so that when data is written on the track on the optical storage medium, a mark is recorded on the track by the zero-order diffracted light beam; and a processing section configured to read the mark that has been recorded on the track based on the output of the optical pickup device while writing data on the track on the optical storage medium.

13. The optical read/write apparatus of claim 12, wherein the processing section generates a read signal based on a differential signal representing a difference in the intensity between reflected light that has left the light beam spot of the +first-order diffracted light beam and reflected light that has left the light beam spot of the −first-order diffracted light beam.

14. An optical read/write apparatus comprising:

the optical pickup device of claim 11;

an optical modulator configured to modulate the intensity of the first light beam so that when data is written on the track on the optical storage medium, a mark is recorded on the track by the first light beam; and a processing section configured to read the mark that has been recorded on the track based on the output of the optical pickup device while writing data on the track on the optical storage medium.

15. The optical read/write apparatus of claim 12, wherein the apparatus includes at least one more optical pickup device in addition to the optical pickup device, and wherein those optical pickup devices write data on multiple different tracks on the optical storage medium in parallel with each other.

* * * * *